(12) United States Patent
Volatier et al.

(10) Patent No.: US 11,464,359 B2
(45) Date of Patent: *Oct. 11, 2022

(54) METHOD FOR PROVIDING INFORMATION ON THE COOKING OF A FOOD ITEM, AND ASSOCIATED APPARATUS

(71) Applicant: SEB S.A., Ecully (FR)

(72) Inventors: Sebastien Volatier, Dijon (FR); Dominique Excoffier, Rumilly (FR)

(73) Assignee: SEB S.A.

( * ) Notice: Subject to any disclaimer, the term of this patent is extended or adjusted under 35 U.S.C. 154(b) by 0 days.

This patent is subject to a terminal disclaimer.

(21) Appl. No.: 16/580,686

(22) Filed: Sep. 24, 2019

(65) Prior Publication Data

US 2020/0015625 A1   Jan. 16, 2020

Related U.S. Application Data

(63) Continuation of application No. 14/372,374, filed as application No. PCT/FR2013/050046 on Jan. 9, 2013, now Pat. No. 11,206,945.

(30) Foreign Application Priority Data

Jan. 16, 2012 (FR) ...................................... 1250416

(51) Int. Cl.
*A47J 37/06* (2006.01)
*A47J 36/32* (2006.01)

(52) U.S. Cl.
CPC ........... *A47J 37/0611* (2013.01); *A47J 36/32* (2013.01)

(58) Field of Classification Search
CPC .............................. A47J 37/0611; A47J 36/32
See application file for complete search history.

(56) References Cited

U.S. PATENT DOCUMENTS

| 4,036,995 | A | 7/1977 | Koether |
| 4,511,789 | A | 4/1985 | Goessler |
| 6,425,319 | B1 | 7/2002 | Wu |
| 8,931,400 | B1 * | 1/2015 | Allen ..................... A47J 36/321 |
| | | | 99/344 |
| 2006/0144384 | A1 | 7/2006 | Santagata |
| 2006/0254430 | A1 | 11/2006 | Nevarez et al. |
| 2007/0254078 | A1 | 11/2007 | Calzada |
| 2007/0288192 | A1 | 12/2007 | Imgram et al. |
| 2008/0083730 | A1 | 4/2008 | Dolgov et al. |
| 2009/0324785 | A1 | 12/2009 | Ceravalls Pujol et al. |

(Continued)

FOREIGN PATENT DOCUMENTS

| DE | 4302190 A1 | 7/1994 | |
| WO | 95/28116 A1 | 10/1995 | |
| WO | WO-2005082212 A1 * | 9/2005 | ............ A47J 37/044 |

(Continued)

*Primary Examiner* — Steven N Leff
(74) *Attorney, Agent, or Firm* — Lerner, David, Littenberg, Krumholz & Mentlik, LLP

(57) ABSTRACT

Provided is an apparatus for cooking a food cooked by contact, characterized in that the apparatus is made to transmit information to a user after a period of time during which the food is heated by the resistor(s) has elapsed, said period of time depending on at least one value of the internal cooking temperature of the food, which is prestored in a memory of the apparatus at the factory prior to the first operational use thereof.

9 Claims, 6 Drawing Sheets

(56) References Cited

U.S. PATENT DOCUMENTS

2010/0274527 A1* 10/2010 Ruff .................. G04G 15/006
                                                      702/178
2011/0062141 A1    3/2011 Adesso

FOREIGN PATENT DOCUMENTS

| WO | 2007009880 A1 | 1/2007 |
| WO | 2007127072 A2 | 11/2007 |
| WO | 2007/149063 A2 | 12/2007 |

* cited by examiner

METHOD FOR PROVIDING INFORMATION ON THE COOKING OF A FOOD ITEM, AND ASSOCIATED APPARATUS

CROSS-REFERENCE TO RELATED APPLICATIONS

This application is a continuation of U.S. patent application Ser. No. 14/372,374, filed Jul. 15, 2014, which is the United States national phase of International Application No. PCT/FR2013/050046 filed Jan. 9, 2013, and claims priority to French Patent Application No. 1250416 filed Jan. 16, 2012, the disclosures of which are hereby incorporated in their entirety by reference.

FIELD OF THE INVENTION

The present invention relates to a method for implementing an apparatus for cooking a food item, comprising at least one heating plate in contact with which the food can be cooked.

An apparatus of this type is also concerned.

DESCRIPTION OF RELATED ART

The apparatuses that are known include notably the dual-surface grilles which comprise lower and upper heating plates between which one or more food items that have to be cooked on contact with them are positioned. The food items can be meat, fish, vegetables or other foods.

DE 4302190 and WO 2007/149063 disclose a cooking method and apparatus that are illustrative of the prior art.

However, these known solutions do not make it possible to provide the user of the apparatus with suitable information, and do so in an appropriate manner.

Nor do they make it possible to provide an automatic cooking that is truly favorable to the food and to the taste of the user.

Thus, the invention aims to provide a cooking process and optimized information to obtain:
- a favorable organoleptic result,
- an appropriate core cooking,
- a texture and color to everyone's taste,
- ease of operation for the user,
- information enabling the user to achieve this easily, reproducibly and relevantly,
- a solution that is deemed practical and clear.

SUMMARY OF THE INVENTION

To tend toward the satisfaction of at least some of these objectives, a method for implementing a cooking apparatus of the type described above is first proposed, which is characterized firstly in that, at the end of a heating time of the food by one or more resistor(s), this apparatus is made to indicate, to a user, information which is dependent on at least one internal cooking temperature value (X) of the food stored in the apparatus.

Secondarily, which can be independent of or dependent on the above, this method is characterized in that:
- different (so-called) internal cooking temperatures for the food are stored in memory,
- and to be able to deliver the food to the user with an internal cooking as desired, the following steps are carried out:
  said (a) placing in contact of this food with the heating plate or plates,
  a calculation by the apparatus of the cooking time of the food as a function of at least one of the stored temperatures (X),
  and said (an) indication to the user of the (an) information (item) indicating to him or her that the cooking has been achieved.

Storage in memory will be able to be a prestorage stored in the factory, before the first operational use of the apparatus.

Thus, the risks of errors and the intervention of the user will be limited.

Before continuing, it will also be noted that it would be possible to choose, when the apparatus is operating and to achieve the internal cooking of the food to a greater or lesser degree than desired by the user, that there is selection by the user, on the apparatus, of one of said stored temperatures (X), before the food is placed in contact with the heating plate or plates.

Whatever the case, to favor the reaching of a favorable organoleptic result and of an appropriate core cooking, it is recommended that the apparatus indicate said information to the user, notably at the end of the calculated cooking time (T).

To the same end and for a texture and color to everyone's taste, it is recommended that, with the apparatus operating, and when the food is in contact with the heating plate or plates, this apparatus measure the temperature of at least one of the heating plates and:
- compute the cooking time for the food also as a function of this measured temperature,
- and/or, when a predetermined preheating temperature is reached, address to the user information which indicates same to him or her.

Again to the same end, and in order to optimize the quality of the result achieved, it is recommended that, with the apparatus operating and when the food is in contact with the heating plate or plates, it perform:
- a measurement of the thickness (Y) of the duly positioned food and/or an estimation of the surface area (Z) occupied by this food on the heating plate, upon which said trend of the internal cooking temperature (X) of the food depends,
- then said calculation of the cooking time (T) for the food as a function of the thickness (Y) of the food, and/or of the surface area (Z) that it occupies.

In order to simplify the intervention of the user in the operation of the apparatus, without affecting the quality of the cooking achieved, it is recommended that:
- said calculation of the cooking time (T) for the food comprise the calculation of a first cooking time (T), as a function of the lowest temperature (X) out of those stored in memory,
- at the end of said first calculated cooking time (T), there is an indication to the user, by the apparatus, that the corresponding cooking has been achieved, then:
- if the user does not remove the food, there is application by the apparatus of a second calculated cooking time (T) for the food, as a function of the second in ascending order of said temperatures stored in memory (X),
- at the end of this second calculated cooking time (T), there is once again an indication to the user, by the apparatus, that the corresponding cooking has been achieved,
- and so on.

Once again to simplify the intervention of the user in the operation of the apparatus, without affecting the quality of the cooking achieved, it is recommended that, during said operation of the apparatus, the food be positioned between a plurality of said heating plates, in contact with them.

Thus, there will notably be no need to turn over the food and, if provided, the measurement of the thickness (Y) of the food will be able to be simplified.

To refine the quality of the cooking achieved, and therefore the benefit for the user of the information delivered, it is recommended:

that at least one of the following steps be provided:
  selection of the category of the food to be cooked,
  selection of the frozen state of the food,
  selection of a desired grille marking of the food,
and that the preheating temperature depends on the or said selections made and be selected by the apparatus out of several temperatures previously stored in memory.

Finally, again to simplify the intervention of the user in the operation of the apparatus, without affecting the quality of the cooking achieved, it is recommended that, at the end of the step (A) of preheating of the apparatus, the start of the step (B) of cooking of the food be detected automatically by the apparatus, by a lowering beyond a predetermined threshold of the measured temperature of the or of one of the heating plates.

Now with regard to the cooking apparatus itself, which therefore comprises at least one heating plate for cooking concerned by its contact, it is characterized in that it comprises, to achieve an internal cooking of the food to a greater or lesser degree desired by a user:

a memory for storing different temperatures (X) before the first operational use of the apparatus, means for measuring the thickness (Y) of the food then positioned in contact with the heating plate or plates and/or means for estimating the surface area (Z) occupied by this food on the or one of the heating plates, means for calculating at least one cooking time (T) for the duly positioned food, as a function:
  of at least one of the temperatures (X) out of those stored in memory, and
  of the thickness (Y) of the food, and/or of the surface area (Z) occupied by the food; and
means for indication to the user, by the apparatus, of information at the end of said calculated cooking time, which is a function of at least one of the stored temperature values (X).

These stored temperatures will be, or a priori comprise, temperatures (X) characteristic of internal cooking of the food, such as, for example, for a meat: rare, medium, well done.

In order once again to simplify the intervention of the user in the context of the user/apparatus interface, it is recommended that the indication means comprise:
  a luminous display,
  a chromatic reference frame showing a number of colors or color intensities, and
  means for varying the color or the color intensity of the display, from one color or color intensity from the reference frame to another.

In the same context of simplicity of intervention of the user and of relevance of the information supplied, it is recommended that the apparatus comprise at least one temperature sensor for the heating plate or plates linked to the indication means, to have them indicate to the user information that a predetermined preheating temperature, stored in memory, has been reached.

To favor having the user obtain information that he or she will deem practical, relevant and clear, with a reliable solution, it is also proposed that:

the luminous display comprise multicolored LEDs,
and that the means comprise means for sequencing the colors or color intensities by variations of chromatic coordinates.

The user could in fact wish to act him- or her-self, positively, on this choice, via such a manual selection.

BRIEF DESCRIPTION OF THE DRAWINGS

Other features and advantages of the invention will emerge clearly from the description given below, in the case of a common use of the abovementioned three parameters (X, Y, Z), and in an indicative and in no way limiting manner, with reference to the attached drawings, in which.

DETAILED DESCRIPTION OF THE INVENTION

Figure 1:
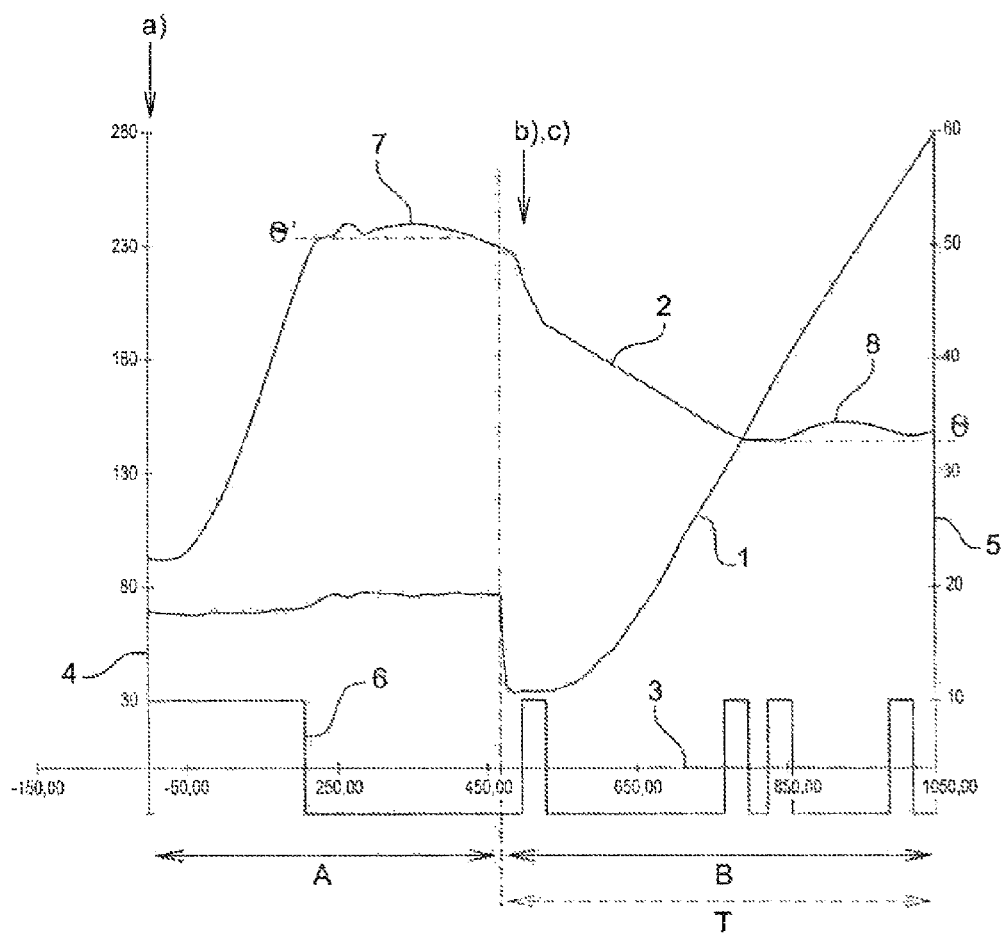
FIG. 1 represents an example of a cooking process according to one embodiment of the invention.

The cooking apparatus which what is described below is intended to be implemented comprises, in the illustrations, two shells articulated relative to one another, including a lower shell 9 and an upper shell 90; see FIG. 7. The lower shell 9 comprises a lower heating plate 61 and the upper shell comprises an upper heating plate 63. Each shell comprises a heating resistor 10 positioned between the heating plate and the bottom of the shell. The food is cooked by contact between plate(s) and food items. The food may be meat, or other food.

Notably in this context, there has therefore been:
in the factory, a storage in memory 72 of the apparatus of different internal cooking temperatures (X) for the food,
then, with the apparatus operating and to achieve an internal cooking of the food to a greater or lesser degree, then desired by the user:
  a placing of the food in contact with the heating plate(s) 61, 63 and a calculation by the apparatus of the cooking time for the food as a function of at least one of the stored temperatures (X),
  and an indication by the apparatus to the user, in the example via the display 79, of information which depends on the trend of said cooking temperature (X).

In other words, the information intended for the user has been indicated by the apparatus, here via the display 79, at the end of a heating time for the food (via the resistor(s) 10) which is a function of at least one internal cooking temperature value (X) for the food prestored in memory 72 of the apparatus, in the factory, before its first operational use.

Specifically, the apparatus has here indicated said information to the user, notably at the end of the calculated cooking time (T).

And it has, even during cooking, measured the temperature of at least one of the heating plates 61, 63 and calculated the cooking time for the food also as a function of this measured temperature.

It has even also, favorably:
performed a measurement of the thickness (Y) of the duly positioned food and/or an estimation of the surface area (Z) occupied by this food on the heating plate, on which depends said trend of the internal cooking temperature (X) for the food,
then conducted said calculation of the cooking time (T) for the food as a function of these parameters (Y) and/or (Z).

It has been understood that the information indicated by the apparatus to the user concerns (is linked to) the cooking of the food.

To enable the user to have his or her food at the right temperature so that it is, if necessary, seared appropriately, the apparatus has also, on reaching the predetermined preheating temperature, addressed to the user information which has indicated it to him or her.

In this context preferably, here:
at least one of the following steps is conducted:
selection of the category of the food to be cooked (buttons 880 FIG. 9),
selection of the frozen state of the food, if such is the case (button 881),
selection of a desired grille marking of the food,
if necessary, final validation of the choice (button 883),
and the preheating temperature θ' depends on the or said selection(s) made and is selected by the apparatus from a number of temperatures previously stored (in 72).

Figure 7:
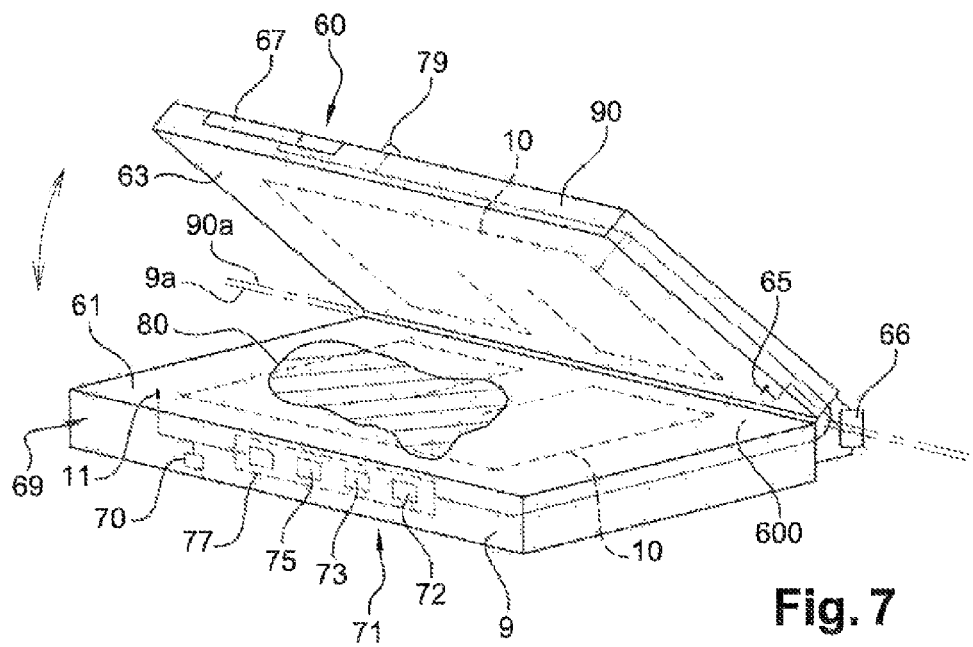
FIGS. 7, 8 show a cooking apparatus of grille type that makes it possible to implement the method that is the subject of the invention, and FIG. 9 schematically represents, as indicator for the user, a luminous display with chromatic reference frame and means for varying colors or color intensities.
Figure 8:
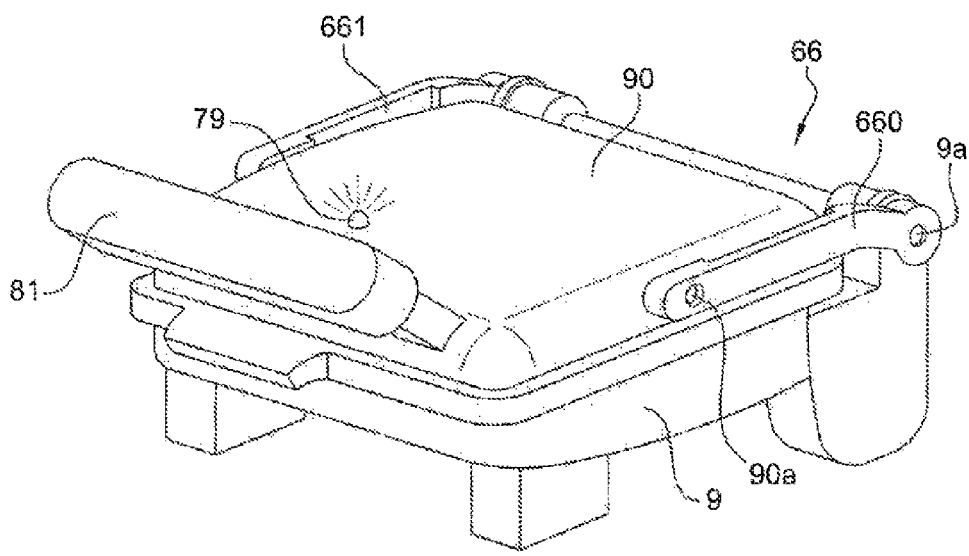

To the cooking apparatus of FIGS. 7 and 8, it therefore comprises means 79 for indicating to the user anticipated (cooking) information, linked to the end having been reached of said calculated cooking time.

Figure 9:
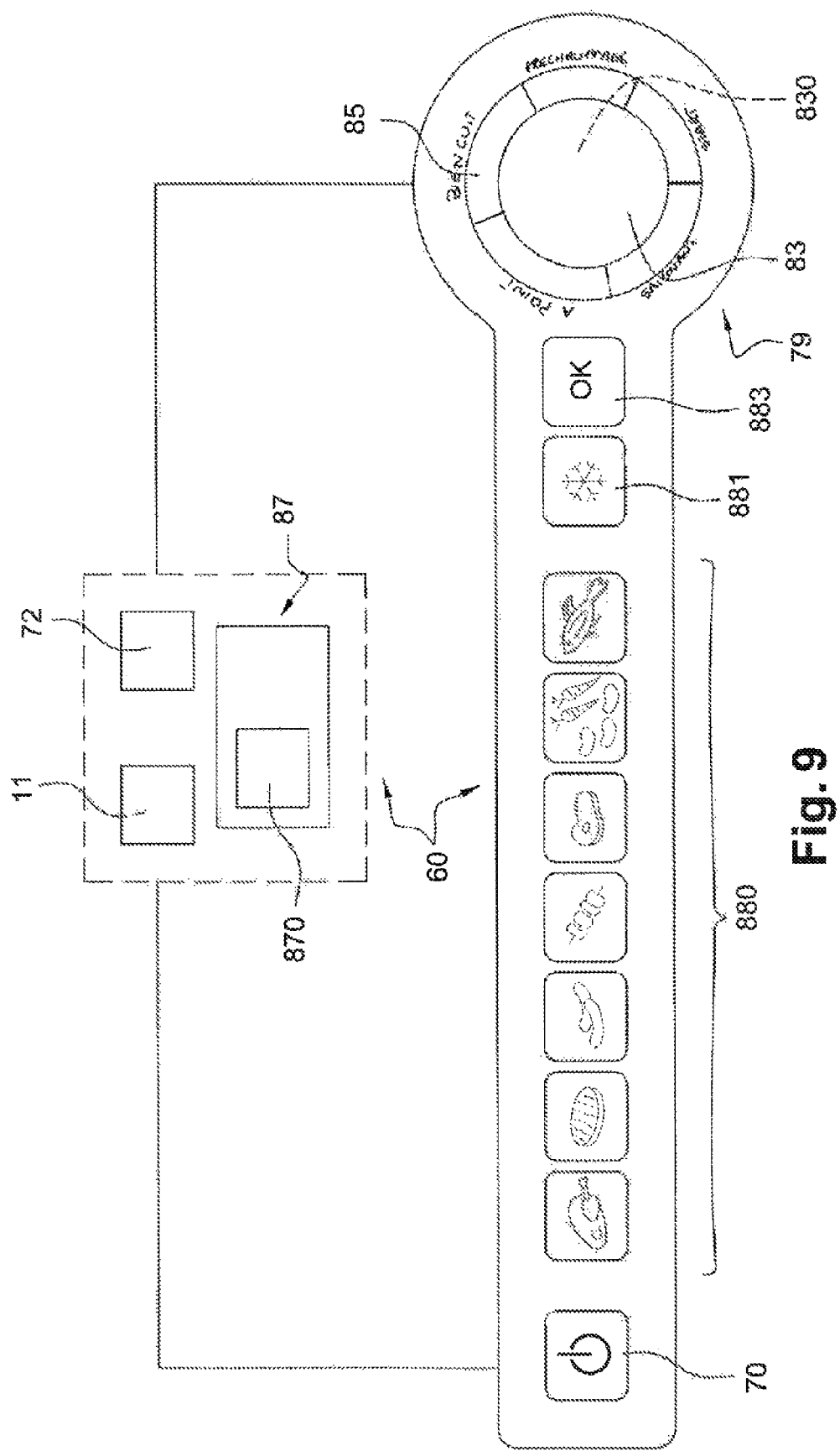

More specifically, FIG. 9 shows that the indication means 79, here visual, preferably comprise:
a luminous display 83,
a chromatic reference frame 85 showing a number of colors or color intensities, and
means 87 for varying the color or color intensity of the display, from one color or color intensity of the reference frame to another.

Preferably, the luminous display will comprise, as schematically represented in FIG. 9, multicolored light-emitting diodes 830 and the variation means 87 will comprise means 870 for sequencing the colors or color intensities by variations of chromatic coordinates.

These means will be able to be an electronic card controlling the change of color. The main multi-colored electronic diodes may be made up of three small diodes each emitting in a primary color. The control technique (which may be of the PWM type) may make it possible to independently modulate the pulse widths of the three colors which make up the diode (such as blue, green, red). All the main diodes are controlled independently.

The indication means 79 will favorably be linked to at least one temperature sensor (11 or 11*a*, 11*b* hereinbelow) provided to detect that of the plate or plates 61, 63, to make them indicate to the user information that the predetermined preheating temperature stored in memory 72 has been reached.

As for the variation means 87, they will, at least functionally, be linked to the microcontroller(s) cited later 73, 75, 77 and therefore to the means also cited later 65, 66, 67, 69/11 (or 11*a*, 11*b*), 70, 71, 72, 79 and to the resistors 10, for their control.

That said, the cooking method in itself will comprise, as illustrated in FIG. 1, a preheating A) of the apparatus followed by a cooking B) of the food for a time (T).

FIG. 1 represents, as an example, a process of cooking an unfrozen meat. The curve 1 represents the trend of the temperature measured at the core of the food as a function of time. Here, it has been acquired in the factory and does not necessarily exist in the marketed apparatus. At least some of these points are, however, entered into memory 72 of the apparatus. The curve 2 represents the trend as a function of time of the temperature of one of the heating plates, which is measured during the commercial operation of the apparatus. The X axis 3 represents the time in seconds, the Y axis on the left 4 represents the measured temperature of the heating plate concerned, such as 63, and the Y axis on the right 5 represents the temperature measured at the core of the food. The curve 6 represents the heating cycle as a function of time (power consumed). During the step A), the measured plate temperature rises rapidly to a level 7 corresponding to a preheating temperature. In the example 2, this temperature is approximately 230° C. Once this is reached, the food is placed on the lower heating plate. The high contact temperature makes it possible to perform a marking on the food. A crust is then formed.

The placing of the food in the heating apparatus corresponds to the start of the step of cooking of the food B). The measured temperature of the heating plate (curve 2) drops to a temperature stabilization level 8, corresponding to approximately 150° C. in the example.

By way of confirmation (since a priori not available in the apparatus), the curve 1 shows that the temperature of the food rises in the mean time gradually to a temperature which is a function of the category of the food, even of its frozen state.

What FIG. 1 does not show is that, before any cooking process, conducted for example with the apparatus schematically represented in FIG. 9, there has typically been able to have been, in the factory (therefore before the marketing of the apparatus), a storage in memory 72 of the apparatus, notably of different internal cooking temperatures (X) for the food (preferably for several food items) making it possible to reach, for at least one given food, several core cooking levels (internal).

Then, as indicated above, it is therefore possible to choose for there to be a positive selection by the user, on the apparatus, of one of these stored temperatures (X).

Figure 3:
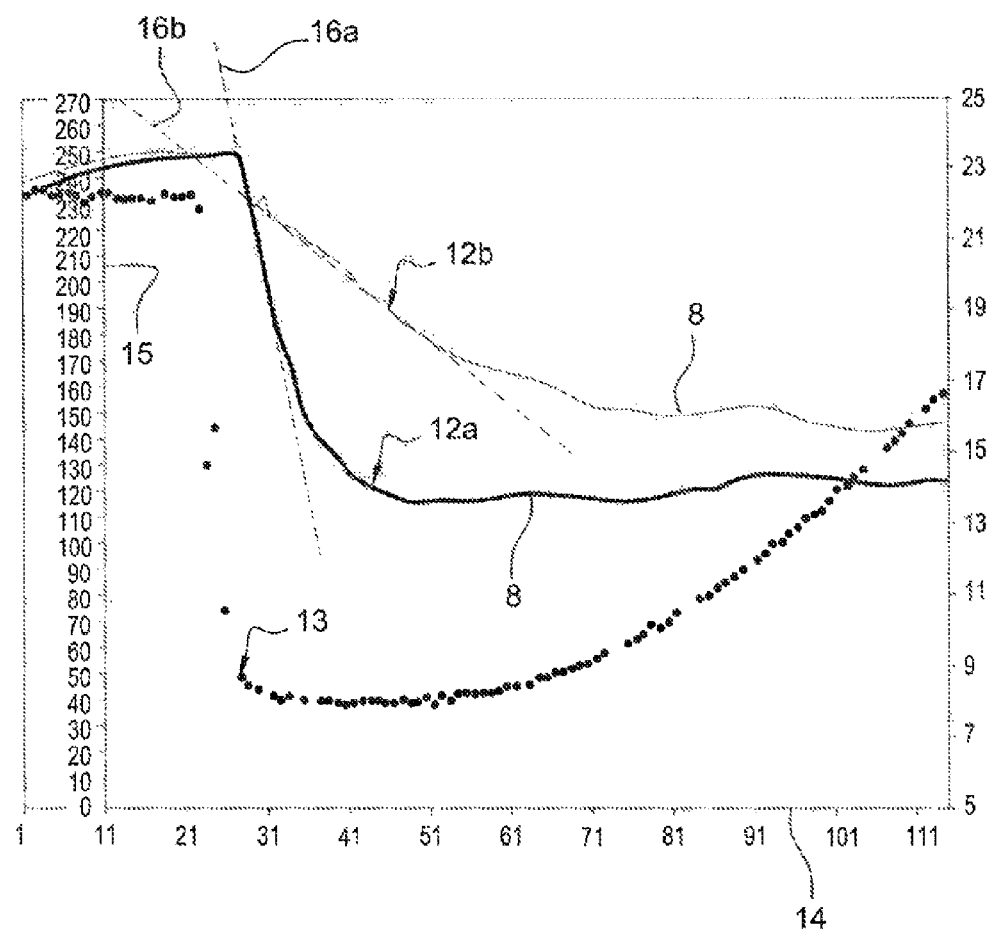
FIG. 3 represents the two temperature curves measured by two temperature sensors of one of the shells, such as the lower shell, and the temperature curve measured at the core of the food as a function of time.

In this case, the apparatus having been sold, when its user goes to use it, what follows may be implemented:
powering up of the apparatus 1, for example by pressing on an on/off button 70;
via the interface 67 of the apparatus, and in the menu that the latter then displays, selection, therefore on the apparatus, by the user, preferably first of all of a category of food to be cooked (choice for example between meat and fish), then, here, a degree (X) of internal cooking desired for the food, out of a number available (if provided);

automatic determination:
- of the temperatures θ: maximum preheating temperature (before the placement of the food) taking into account the category of the food, if the latter can be selected, and θ': minimum or final cooking temperature of the food (after its placement of the food), once again taking into account its category, if provided,
- and of the duty cycle: changes of the electrical energy supplied to the resistors 10 from the source provided (such as the mains); definition and application of the variations, which can be binary—maximum or zero—, of this energy; see curve 6;

automatic preheating of the apparatus (step A), via the resistors 10, with application of a predetermined preheating time defined in factory tests, then entered into memory 72 and which makes it possible to reach the stabilized temperature θ during the interval provided;

with the apparatus open, placement of the food;

closure of the apparatus; this will preferably be necessary to activate the start of the cooking of the food (step B), then with, preferably automatically, a measurement of the thickness (Y) of the food introduced between the plates 61, 63;

the apparatus then automatically detects an abrupt lowering of the measured temperature of the heating plate concerned (contact with the food), after which the temperature is substantially stabilized; see zone 8, FIG. 1 or 3. Preferably this start of cooking step B) will be detected:
- as a function of this lowering of measured temperature (s) (in time, speed, slope, etc.),
- and, comparatively, with one or more predetermined thresholds of the temperature drop detected;

from this/these temperature variation(s) measured on the plate concerned of the grille, there may then be an estimation of the load (or surface area occupied by the food): abovementioned parameter (Z);

again preferably at the start of this cooking step, there is also estimation/calculation by the apparatus of the required cooking time (T). This time is therefore that, indicated for example in FIG. 1 (T), between the moment when the food is placed in contact with the heating plate(s) and that when it is removed therefrom, at the end of cooking. The origin moment may typically be that of the closure of the apparatus, if it is a grille, followed almost immediately by the measured drop in temperature of the plate. The end moment is also that when the announcement that the cooking is done is made by the apparatus. The expected temperature/degree (X) of internal cooking is reached;

via, for example, a microcontroller 73, 75, and an indicator 79 accessible to the user, provision is then made for the user to be, at the end of the calculated time, informed by the apparatus that the expected degree (X) of cooking has been reached; the user is thus prompted to remove his or her food;

the apparatus can then for example automatically keep the food hot waiting for the user to open the apparatus;

the apparatus can finally be powered down, for example via the switch 70.

Thus, the end of cooking established at the end of the estimated/calculated time T, when, once the food has been placed in the preheated apparatus, the measured temperature, after having dropped because of this food, is stabilized (zone 8, FIG. 1 or 4), for example between two values for which the difference has been predefined and entered into memory 72;

In addition to the above, the interface 67 with the user can be able to make it possible to select, from the menu, the frozen state of the food (frozen or not) and/or the extent of the grille marking desired (strongly marked or other).

The interface 67 can be a touchscreen.

In the above scheme, the cooking time (T) for the food in the abovementioned step B) is determined by a process in which the following steps are conducted:
- a step of measurement of the thickness (Y) of the food,
- a step of estimation by the apparatus of the surface area (Z) occupied by the food on one of the heating plates,
- a step of calculation in the apparatus of a cooking time (T) for the food as a function:
  - of the degree (X) of internal cooking of the food,
  - of the thickness (Y) of the food,
  - of the surface area (Z) occupied by the food.

The degrees (X) that can be selected will be able to correspond to cooking cycles that are respectively rare, medium and well done. Each case will have, in memory 72, a corresponding cooking temperature taken from the curve 1, in the factory. Thus, it will be possible to have three parameter values, respectively 55° C., 65° C. and 75° C.

To measure the thickness (Y) of the food, sensor means 65 can be provided on the apparatus, detecting the average distance between the lower and upper heating plates, 61, 63, and in particular their relative separation when the food is introduced between them. It is then possible to obtain a food thickness which is a function of the relative displacement distance of the plates between them, upon the closure of the apparatus.

In FIG. 7, it can be seen that these heating plates are rotationally mobile relative to one another. When the upper heating plate is in horizontal position after having been displaced toward the lower heating plate, a positioning mechanism 66 can linearly and vertically displace the upper heating plate (by bringing one of these plates closer to or further away from the other) until there is contact with the interposed food.

By way of example, the sensor means 65 can comprise at least one optoelectronic inductive proximity sensor. It could alternatively be a force sensor measuring for example the force on a spring blade via a strain gauge, or a magnetic incremental positioning sensor using the Hall effect (again measuring distance).

Once the preheating is finished, the automatic triggering, by the apparatus, of the cooking step will preferably take place only if the sensor means 65 measure a value that is neither zero nor "infinity".

In FIG. 8, it can be seen that the positioning means or mechanism 66 comprise arms 660, 661 mounted articulated between the lower 9 and upper 90 shells. These arms, here two of them, 660, 661, are fixed, here laterally, close to one of the edges of each of the shells, such that two parallel rotation axes 9a, 90a (horizontal) passing through the fixings of the arms 660, 661 are defined, for the relative movements between the heating plates. Opposite, a handle 81 fixed to one of the shells, here 90, assists in the maneuver.

During the step of estimation of the abovementioned surface area (Z), means for estimating this surface area determine whether the heating plate, provided with the load sensor(s), is fully loaded, partially loaded, or not loaded (cooking apparatus empty). This estimation can therefore be obtained from temperature data variations measured on (at least) one of these plates.

The step will preferably comprise, advantageously during a predefined time (T) which begins from the detection of the start of the cooking step B):
- a substep of measurement of the temperature of the heating plate fitted (upper plate 63, FIG. 7),
- then a substep of determination of this surface area (Z) as a function:
  - a) of time calculated to achieve a substantially zero stabilized slope (abovementioned zone 8, FIGS. 1, 3) of the trend of this measured temperature,
  - b) or of a drop in this temperature compared to a predetermined threshold (value(s) in terms of amplitude, on reaching a minimum temperature and/or in terms of slope(s) with, in the case a), the existence of a relationship between the surface area and the quantity of energy to be provided to compensate the heat losses due to the placement of the food.

The calculation of this parameter will be able to be done by a computation means such as a microcontroller with which the apparatus is equipped.

Figure 2:
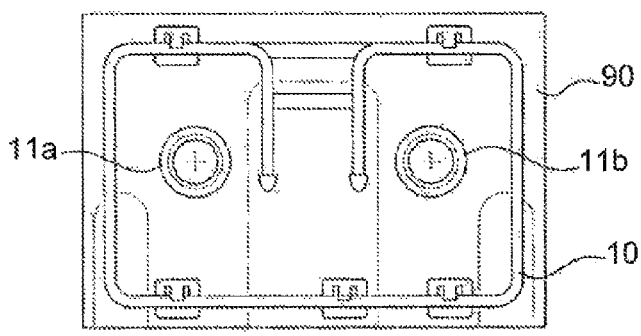
FIG. 2 represents a lower shell of a cooking apparatus provided with two temperature sensors, according to one embodiment of the invention.

With a multi-sensor solution, such as, for example, with the two temperature sensors 11a, 11b, shown in FIG. 2 (even if it might be preferred to place a first sensor centered on one side (such as 11a in FIG. 3), and a second off-center), comparisons, preferably of slope values, calculated for one and the other of these sensors, with a predetermined threshold, stored in memory 72, will be able to make it possible to define the parameter values (Z) to be used.

With the solution with two temperature sensors 11a, 11b shown in FIG. 2, and if the parameter retained is the slope, the following thresholds will be able to be considered:
- if slope>−0.5° C./s for the two sensors=>surface area Z has little or no load=>value Z1,
- if slope<−0.5° C./s for one of the sensors, with=>surface area Z averagely loaded=>value Z2,
- if slope<−0.5° C./s for the two sensors=>surface area Z fully loaded=>value Z3.

For the temperature sensor(s), it will be possible to choose probes with negative temperature coefficient (NTC). They will be able to be housed behind the heating plate which covers them internally.

Computation means then make it possible to calculate the cooking time (T) for the food as a function of the degree of the internal cooking temperature (X) desired, here selected, for the food, of the thickness (Y) of the food, and/or of the surface area (Z) that it occupies.

This cooking time (T) for the food can be determined by a quadratic correlation calculation method with the following second degree function:

$$T(X,Y,Z)=A1+A2*X+A3*Y+A4*Z+A5*X^2+A6*Y^2+A7*Z^2+A8*X*Y+A9*X*Z+A10*Y*Z \quad (1)$$

The coefficients A1, A2, A3, A4, A5, A6, A7, A8, A9 and A10 are predefined for each menu, for predefined temperature conditions. They are stored in storage means (such as the memory 72). They are constants.

As a variant, the cooking time (T) for the food can be determined by a linear correlation calculation method with the following first degree function:

$$T(X,Y,Z)=B1+B2*X+B3*Y+B4*Z \quad (2)$$

The coefficients B1, B2, B3 and B4 are predefined for each menu, for predefined temperature conditions. They are stored in said storage means (memory 72 for example). They are constants.

Regarding the estimation of the surface area occupied by the food items, the possibility of an estimation of the surface area (Z) via (at least) two temperature sensors (values Z1, Z2, etc.) has been described above.

Another possibility consists in using only a single energy sensor (item 11, FIG. 7) which can be a temperature probe placed, as previously, in contact with one of the heating plates. Favorably, this sensor will be remotely cited at (toward) the periphery of the heating plate concerned, facing a zone of the plate where food should not (or cannot) be placed. The sensor will be able to fulfill two functions, in conjunction with the microcontroller(s):
- regulating the temperature of the plate,
- measuring the quantity of energy to be provided to compensate the losses linked to the presence of the food or foods on the plate. Assuming that the food items are steaks (see FIGS. 4-6), it will be possible to correlate this with the number of such steaks present being cooked on the plate, or the extent of the occupied surface area.

Thus:
- a slope beyond a first threshold retained and stored in memory 72 will be able to correspond to a heating plate fully occupied by the food,
- a slope below a second threshold will be able to correspond to an unoccupied heating plate,
- and a slope between the two thresholds will be able to correspond to a partially occupied heating plate.

Figure 4:
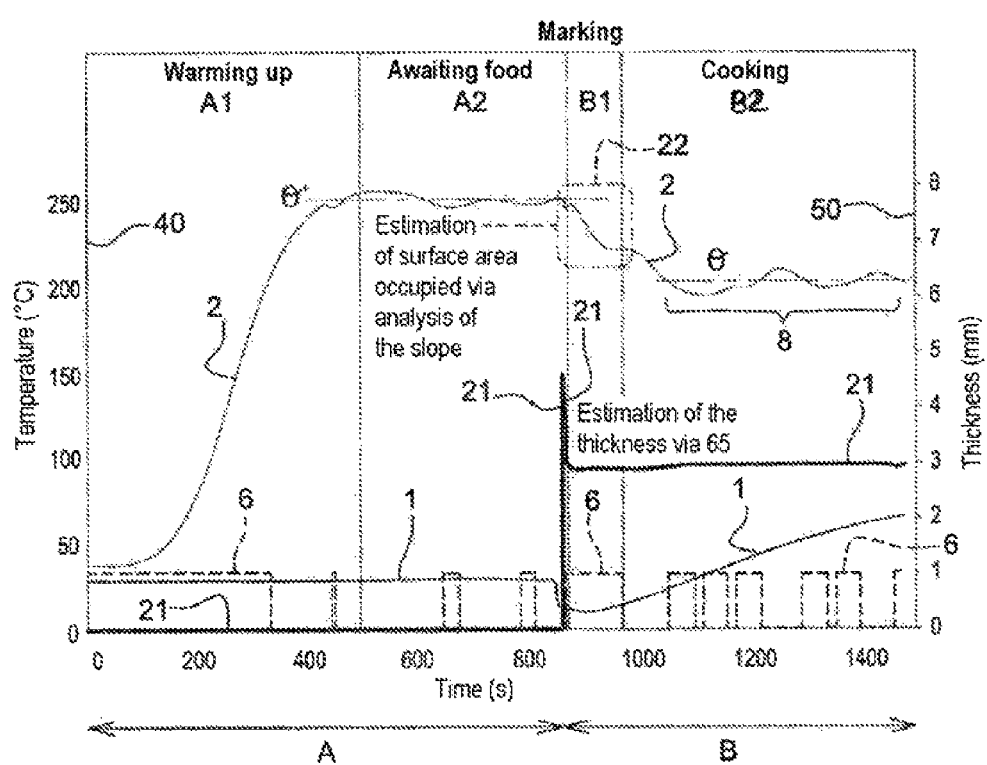
FIG. 4 shows an example of cooking kinetics ensuring a cooking with marking, independently of the number of food items on the plate, with measurement of temperatures by a single sensor, FIGS. 5, 6 respectively show the trend of the temperature of the temperature sensor provided, as a function of time and of the surface area occupied by the food, and the trend of the slope of the curve 2 as a function of time and of the surface area occupied.

To illustrate this, FIG. 4 shows an example of cooking kinetics established on the following basis: cooking of three joints/steaks cut from a topside round, common thickness of 29 mm, identical surface areas of the plates 61, 63 substantially fully occupied (except just at the periphery where the temperature sensor 11 is located; FIG. 7), expected core temperature (at the end of cooking) of approximately 60° C., cooking time of approximately 23 min (calculated).

These kinetics could be considered to be valid regardless of the surface area estimation method used; it could therefore replace the illustration of FIG. 1 where the curve 2 concerned a multi-sensor application.

In FIG. 4, the X axis represents the time in seconds, the Y axis on the left 4 represents the temperature (° C.). The Y axis on the right 50 represents the thickness (mm) of the food. The curve 21 represents the trend of the thickness of the food/food items present on the heating plate as a function of time. The trend of the curve 2 is comparable to that of FIG. 1 (see comments above). After the step A (=A1+A2) of preheating, the placing of the food in the heating apparatus corresponds to the start of the step B (=B1+B2) of cooking of this food.

There occur:
- a cooking in two phases:
  - a phase B1 of marking;
  - a phase B2 of cooking at lower temperature, to allow time for the heat to migrate to the core without risking charring the periphery;
- a marking time approximately proportional to the exchange surface area (Z) and therefore to the quantity of food.

Throughout the phase 22 marked by a broken outline square in which there is marking of the food (or food items), there is no reversal of the cycle of delivery of the electrical power (the electrical power/energy delivered to the resistors remains maximum).

This is preferably the interval during which the analysis phase (B1, broken outline square 22, FIG. 4) is performed: values Y and/or Z, calculated time T.

Figure 5:
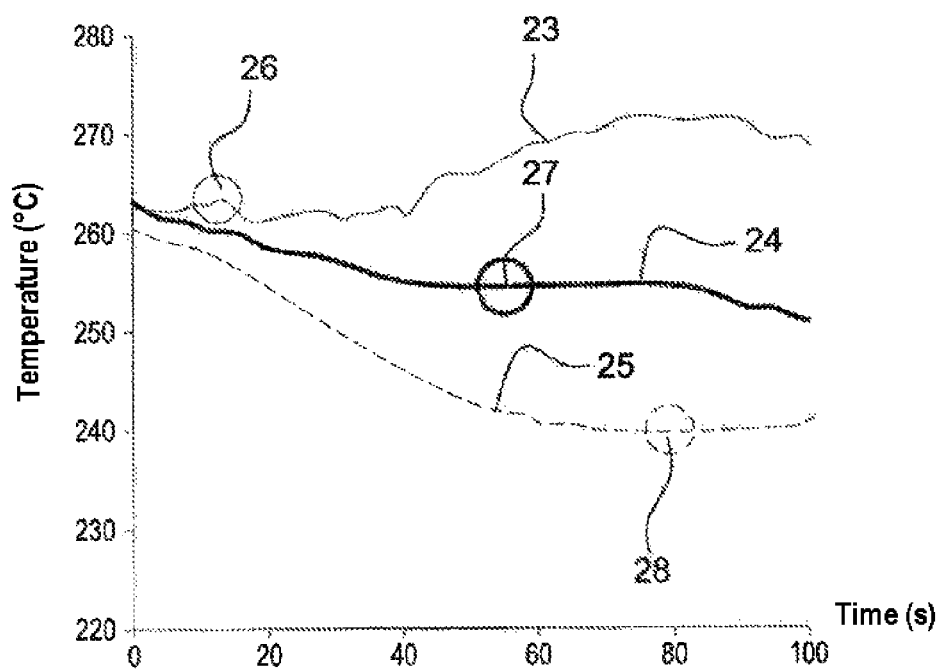
Figure 6:
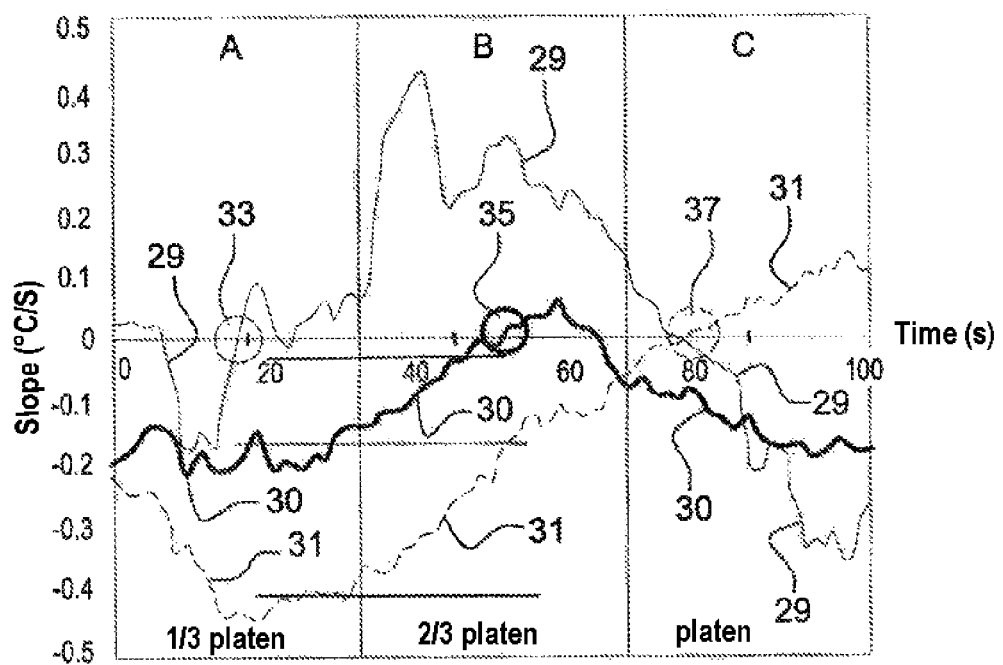

Regarding the estimation of the surface area (Z) occupied by the food items, FIGS. 5, 6 show respectively:

the trend of the detected temperature as a function of time and of said occupied surface area, the trend of the slope of the curve 2 as a function of time and of the occupied surface area.

In FIGS. 5, 6, the origin of the time (T=0) is the moment of placement of the food in the heating apparatus, i.e. here (as indicated in FIGS. 1 and 4) the start of the step of cooking of the food (B).

In FIG. 5, the curves 23, 24, 25 correspond respectively to the steak cases 1, 2, 3. The circles 26, 27, 28 show the respective slope cancellations.

In FIG. 6, the Y axis corresponds to the slope (in ° C./s), the X axis is the time (in s). The curves 29, 30, 31 correspond respectively to the steak cases 1, 2, 3. The circles 33, 35, 37 show the respective slope cancellations (passage through the time X axis).

The analysis of the slope concerned makes it possible to reveal that there are correlations between:

the exchange surface area and the minimum slope, or the temperature drop at a given instant, the exchange surface area and the instant when the slope is cancelled (instant when the slopes linked to the exchanges between the food items and the plate have been compensated).

The second relationship (FIG. 6) is deemed more reliable because it is less dependent on the accuracy of the calculations (see dispersion on curve with the steak) and on the position of the sensor on the plate.

Two methods can be envisaged for estimating the occupied surface area:

establishing, via experimentation conducted in the factory, before the marketing of the apparatus, the affine function (y=ax+b) which links the occupied surface area to the instant when the slope reversed, identifying three zones:

zone A, plate with little load (⅓ of the plate occupied), zone B, plate with average load (⅔ plate), zone C, plate strongly loaded (3/3 plate), then testing the correspondence of the system to one or other of these three zones.

This method is potentially easier to synchronize with the communication to the user of the corresponding information (indicator 79).

In this case:

it is essential for the sensor 11 to be positioned on a zone without food, such as the perimeter of the plate:

the following are taken into account, as explained above:

the existence of a correlation between the reversal of the slope of trend of the temperature detected by the sensor and the exchange surface area between the heating plate concerned and the food (the food items) positioned against this plate: passage through a zero trend slope; see above, the existence of a correlation between the minimum slope and said exchange surface area.

From the above, it will have been understood that two methods have therefore been considered for estimating the occupied surface area:

the first that can use only a single temperature sensor 11 remotely cited at the periphery of the plate concerned, therefore with the existence of a relationship between the surface area occupied by the interposed food and the quantity of energy to be provided to compensate for losses (time observed for a slope of the curve 2 equal to zero), or a greater or lesser temperature drop (temperature threshold), or a faster or slower temperature drop (slope threshold), a second using a number of temperature sensors, such as 11a, 11b, distributed on or under the plate concerned, then with the presence or not of food (food items) in the vicinity of two, three, or even four sensors.

It should also be noted that, if the temperature sensor(s) 11 or 11a, 11b are positioned in such a way that it (they) detects (detect) the temperature of the cooking plate (here upper) which comes into contact with the food only when the two plates 61, 63 are displaced relative to one another to close the apparatus (moment when the cooking time=0), it will then be possible to have two information items for triggering the start of the cooking (phase B): that obtained from the temperature sensor(s) and that from the thickness sensor.

In FIG. 7, it will also be noted that the cooking apparatus 60 of meat grille type therefore comprises the lower 61 and upper 63 heating plates, as follows:

the means 65 for measuring the thickness (Y) of one or more food items (here called "food" 80), such as the abovementioned steak or steaks (these means 65 are linked functionally to the means 66 for relative convergence/separation of the plates 61, 63), the selection means 67 for selecting, from several prestored options, the degree/temperature (X) of internal cooking desired for the food;

means 69 for estimating the surface area (Z) occupied by the food on one of the heating plates; and means 71 for calculating the cooking time (T) for the food.

A cooking chamber 600 for the food (FIG. 7) is defined between the lower 61 and upper 63 heating plates.

The means 69 for estimating the surface area (Z) comprise the abovementioned temperature sensor 11 or sensors 11a, 11b.

To best carry out the estimation of the surface area (Z) occupied by the food 80, it is also recommended that the means 71 for calculating the cooking time (T) for the food comprise the microcontroller 73 configured to determine the slope of the temperature curve obtained from the abovementioned temperature measurements.

And, to the same end, it is also recommended that, with these temperature measurements, this microcontroller, or another 75:

regulate the temperature of the heating plate 61 or 63, and change the quantity of energy to be supplied, by the resistor or resistors 10, as a function of the extent of the surface area occupied by said food items on the heating plate concerned, in order therefore to compensate the temperature drops linked to the placement of these food items between the plates.

The microcontrollers 73, 75 can be combined in a central microcontroller 77. The microcontroller(s) is/are linked to the abovementioned means 65, 66, 67, 69/11 (or 11a, 11b), 70, 71, 72, 79 and to the resistors 10, for their control.

Regarding the taking into account of the degree (X) of internal cooking to be achieved for the food, it has already been understood that it is possible to dispense with the step described above of selection by the user of one of said temperatures stored in memory for this purpose (it is recalled that the abovementioned steps of storage in memory 72, in the factory, of data, algorithms, etc., as mentioned above, are always performed identically).

In this case, when the user decides to use the apparatus that he or she has just bought, he or she simply has to engage the latter which is set to preheating mode, as already explained.

The following then take place:
when the apparatus is functioning and to achieve a greater or lesser internal cooking of the food then desired by a user, the user places the food in contact with the heating plate or plates, such as 61, 63, the apparatus then calculates a first cooking time (T) for the duly positioned food, as a function of the lowest temperature (X) out of those stored in memory, at the end of this first calculated cooking time (T), the apparatus indicates to the user that the corresponding cooking has been achieved (via, for example, the indicator 79), then:

if the user does not remove the food, the apparatus automatically applies a second calculated cooking time (T) for the food, as a function of the second in ascending order of said temperatures stored in memory (X); it will be well understood from the above that this second calculated cooking time makes it possible to increase the cooking of the food which will thus be cooked more, at the end of this second calculated cooking time (T), the apparatus once again indicates to the user that the corresponding cooking has been achieved, and so on.

As already explained, the apparatus will, during operation:
measure the thickness (Y) of the food then positioned against said heating plate and/or estimate the surface area (Z) occupied by this food on this heating plate,
calculate the cooking time (T) for the duly positioned food, as a function:
in addition to said internal cooking temperature (X) out of those stored in memory,
of the thickness (Y) of the food and/or of the surface area (Z) occupied by the food.

For the remainder, the explanations have already been given; they remain valid.

It should however be noted that it is here considered that a cooking apparatus that is heated electrically, by resistors, would address the issue already described, provided that it comprised:
in addition to at least one heating plate on which to position the food to be cooked, and in conjunction with a microcontroller (such as 73, 75, 77) provided in the apparatus,
means for estimating a surface area (Z) occupied by the food on the heating plate, via at least one temperature sensor (such as 11, 11a, 11a) which:
regulates the temperature of the heating plate for which it measures the temperature, and
changes the quantity of electrical energy to be supplied, as a function of the extent of the surface area occupied by the food on the heating plate, in order to compensate the temperature drops linked to the placement of the food, or of the food items, on one of the heating plates, or between these heating plates.

The means for estimating a surface area (Z) will be able to be those of the description on the preceding pages.

Regarding the apparatus concerned that is the subject of the present topic, it could also be an apparatus comprising only a single heating plate for cooking food by contact.

A cooking pan or any cooking utensil with a lid receiving, on contact with it, a food to be cooked (saucepan, cooking pot, etc.) ought to be suitable, provided that it would be linked to a controllable heat source as will have been understood from the above.

Notably in this case, provision could be made for the means for measuring the thickness (Y) of the food placed in contact with the heating plate to be a cover positioned movably on the utensil and provided with the suitable sensor already described. The cover could be annular.

To favor the contact between food and heating plate(s), each plate will, in any case, be preferably full. A grille solution would not then be suitable.

In the above, with reference to the solutions illustrated, provision has been made for the or each (useful) internal cooking temperature value (X) for the food to be prestored in memory of the apparatus, in the factory, before the first operational use of this apparatus. Provision could however be made for this (these) datum (data) to be entered into memory 72 by the user, for example via the interface 67. Thus, provision can be made for the user to enter into memory 72 a cooking temperature value (X) of 45° C., for a meat that is desired to be rare. In this case, there could be no storage in memory in the factory (therefore before the marketing of the apparatus) of the or any different internal cooking temperatures (X) for the food.

It will also be noted that, when used alone, independently of the combination of the other abovementioned features, the following method would also address the issues described above: method for implementing a cooking apparatus that is electrically heated and comprising at least one heating plate on which to position a food item (for cooking by contact), said method comprising a step of preheating A) of the apparatus followed by a step of cooking of the food B), the start of the cooking step B) being marked, and possibly detected, by a lowering beyond a predetermined threshold of the temperature of the heating plate.

The invention claimed is:

1. A method for implementing an apparatus for cooking a kind of food item selected by a user, and comprising two heating plates for cooking the food by contact with both heating plates, wherein, at the end of heating a core of the food by one or more resistor(s) at one of a plurality of internal cooking temperature values (X) stored in a memory of the apparatus, wherein the or each internal cooking temperature value (X) of the food stored in the memory is prestored in a factory, before a first operational use of the apparatus, the apparatus is made to indicate, to a user, information that the one of internal temperature values (X) has been reached and then that the corresponding cooking level has been achieved, said information being indicated to the user at the end of a calculated cooking time (T) depending on the one of internal cooking temperature values (X), and on a measured thickness (Y) of the food and/or on estimated surface area (Z) occupied by the food on the heating plates, wherein, with the apparatus operating and when the food is in contact with the heating plates, the apparatus records the thickness (Y) of the food, and/or records an estimated trend of a slope of the measured temperatures of at least one of the heating plates and the apparatus calculates the cooking time (T) for the selected kind of food item as a function of the recorded thickness (Y) of the food and/or as a function of the estimated trend of a slope of the measured temperatures of at least one of the heating plates, wherein the cooking time (T) for the food is calculated by calculating a first cooking time (T), as a function of the lowest temperature (X) out of those stored in memory, and at the end of the first calculated cooking time (T), the apparatus automatically applies a second calculated cooking time (T) for the food, the calculation of the second cooking time (T) being a function of the second lowest of said temperatures stored in memory (X), wherein the thickness is measured from a sensor and/or the temperatures are measured using at least a temperature sensor placed in contact with one of the heating plates, and wherein when the end of the first cooking time (T) is reached, the apparatus indicates to the user that a first cooking result has been achieved, and when the end of the second cooking time (T) is reached, the apparatus indicates to the user that a second cooking result has been achieved, the second cooking result being different than the first cooking result.

2. The method as claimed in claim 1, wherein, with the apparatus operating and before the food is in contact with the heating plates, it measures the temperature of at least one of the heating plates and, when a predetermined preheating temperature is reached, addresses to the user the information indicating the same to him or her.

3. The cooking method as claimed in claim 2, wherein:
it comprises at least one of the following steps:
selection of a category of the food to be cooked,
selection of a frozen state of the food,
selection of a desired grill marking of the food,
and the preheating temperature depends on the or said selections made and is selected by the apparatus out of several temperatures previously stored in memory.

4. The cooking method as claimed in claim 2, wherein, at the end of the step (A) of preheating of the apparatus, the start of the step (B) of cooking of the food is detected by a lowering beyond a predetermined threshold of the measured temperature of the heating plates.

5. The method as claimed in claim 1, wherein, during said operation of the apparatus, the food is positioned between said heating plates, in contact with them.

6. A cooking apparatus comprising two heating plates for cooking a selected food item by contact between a first one and a second one of the two heating plates, and wherein the apparatus further comprises, to be able to deliver to a user the food with an internal cooking temperature as desired:
means for selecting a food item;
a memory for storing different internal cooking temperatures (X) for each selectable food item, wherein the or each internal cooking temperature value (X) of the food stored in the memory is prestored in a factory, before a first operational use of the apparatus;
means for measuring a thickness (Y) of the food then positioned in contact with the heating plates and/or means for estimating a surface area (Z) occupied by the food on the heating plates;
means for calculating at least one cooking time (T) for the food, as a function:
of at least one of the internal cooking temperatures (X) out of those stored in memory, wherein the cooking time (T) for the food is calculated by calculating a first cooking time (T), as a function of the lowest temperature (X) out of those stored in memory, and at the end of the first calculated cooking time (T), the apparatus is configured to automatically apply a second calculated cooking time (T) for the food, the calculation of the second cooking time (T) being a function of the second lowest of said temperatures stored in memory (X), and
of the thickness (Y) of the food, and/or of the surface area (Z) occupied by the food; and
means for indication to the user, by the apparatus, of information at the end of each calculated cooking time for each internal cooking temperatures (X), which is a function of the considered internal cooking temperature (X) of the stored cooking temperature values (X), the information including indication to the user that a first cooking result has been achieved when the end of the first cooking time (T) is reached depending on the at least one of the internal cooking temperature values (X), and on a measured thickness (Y) of the food and/or on estimated surface area (Z) occupied by the food on the heating plates, and indication to the user that a second cooking result has been achieved when the end of the second cooking time (T) is reached, the second cooking result being different than the first cooking result,
wherein, with the apparatus operating and when the food is in contact with the heating plates, the apparatus is configured to record the thickness (Y) of the food, and/or records an estimated trend of a slope of the measured temperatures of at least one of the heating plates and the apparatus calculates the at least one cooking time (T) for the selected kind of food item as a function of the recorded thickness (Y) of the food and/or as a function of the estimated trend of a slope of the measured temperatures of at least one of the heating plates.

7. The apparatus as claimed in claim 6, wherein the indication means comprise:
a luminous display,
a chromatic reference frame showing a number of colors or color intensities, and
means for varying the color or the color intensity of the luminous display, from one color or color intensity from the reference frame to another.

8. The apparatus as claimed in claim 7, wherein
the luminous display comprises multicolored light-emitting diodes,
and the means comprise means for sequencing the colors or color intensities by variations of chromatic coordinates.

9. The apparatus as claimed in claim 6, further comprising at least one temperature sensor for the heating plates linked to the indication means, to indicate to the user information that a predetermined preheating temperature stored in memory has been reached.

* * * * *